May 25, 1937.  F. J. HOARLE  2,081,538
DECORATIVE ARTIFICIAL PRODUCT
Filed June 26, 1934
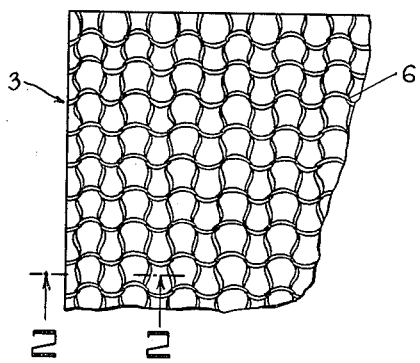
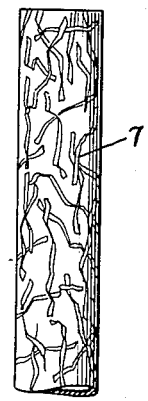
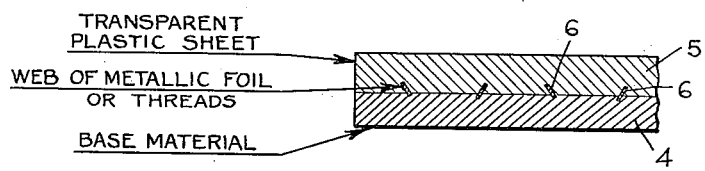
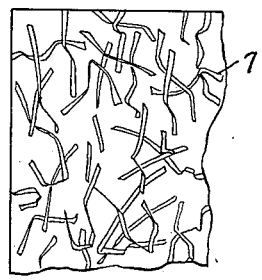
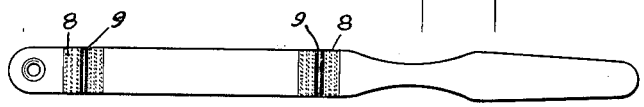
INVENTOR
Fred J. Hoarle
BY
ATTORNEYS Patented May 25, 1937

2,081,538

UNITED STATES PATENT OFFICE 2,081,538

DECORATIVE ARTIFICIAL PRODUCT

Fred J. Hoarle, Newark, N. J., assignor to Celluloid Corporation, a corporation of New Jersey Application June 26, 1934, Serial No. 732,479

18 Claims. (Cl. 41—21)

This invention relates to decorated articles or bodies and more particularly to those formed of laminated plastic material such as the thermoplastic derivatives of cellulose.

An object of the invention is the economic production of a strong and durable laminated article of attractive appearance and one which shall retain its pleasing appearance indefinitely. Other objects of the invention will appear from the following detailed description.

In the accompanying drawing wherein the preferred embodiments of my invention are shown:

Figure 1 is a plan view of a piece of material made in accordance with this invention, showing the decorative effect in the form of a web;

Figure 2 is an enlarged view taken on line 2—2 in Figure 1;

Figure 3 is a plan view of a piece of material made in accordance with this invention showing the decorative effect in the form of threads;

Figure 4 is a detailed view showing the material of Figure 3 in the form of a tube; and Figure 5 is a plan view of the back of a decorated tooth brush handle.

In this invention there are produced fountain pen barrels and similar tube-like articles and sheets or slabs for counter tops and similar purposes which are ornamented in such a way that they are catching to the eye in that there is a scintillating reflection of light rays. The scintillating effect may also be enhanced by a novel color arrangement.

According to my invention I form a laminated sheet material of two like or unlike sheets of plastic material at least one of said sheets having partially embedded therein a metallic foil, thread, straw, tinsel, or lahm cloth in such a manner that the metallic foil is not flattened to a single plane but retains somewhat the twisted, corrugated and/or crinkled effect it naturally contains that gives rise to the scintillating reflection of light as the material is moved or rotated.

Referring to the drawing, the reference numeral 3 indicates a laminated structure comprising a base sheet 4 of any suitable material, and a transparent surface sheet 5 of plastic material. Between said sheets and embedded therein is a web 6 of metallic foil or threads.

In Figures 3 and 4, wherein another embodiment of my invention is shown, instead of the web 6 there are used threads 7 of any suitable material such as, for example, metallic foil. The tube shown in Figure 4 may be one such as is used, for example, in the production of fountain pens.

In the tooth brush handle shown in Figure 5, pieces of metallic foil 8 may alternate with pieces of other material 9 in order to produce a desirable decorative effect.

The threads or tinsel may be made from flattened or drawn copper, aluminum or other metallic filaments and these may be colored and/or mixed with tinsel of several metals. When these colored threads are mixed a beautiful variegated effect results, particularly when the right combination of sheets are employed; for example gold colored threads embedded in a black base, multicolored threads against pearl or lustrous background. These threads may be wound around or woven with fibrous materials to form webs, cloth, etc. It is preferred to use an open design to insure good welding of the plastic sheets as they are not entirely separated by a continuous metallic layer.

The plastic materials that most suitably lend themselves to this invention are the derivatives of cellulose such as cellulose nitrate and the organic esters and ethers of cellulose. Examples of organic esters of cellulose are cellulose acetate, cellulose formate, cellulose propionate and cellulose butyrate, while examples of cellulose ethers are ethyl cellulose, methyl cellulose and benzyl cellulose.

The sheets to be laminated may be formed from any of a mixture of cellulose derivatives. The sheets may contain besides the cellulose derivative any suitable plasticizer such as camphor for cellulose nitrate or other well known plasticizers for derivatives of cellulose such as diethyl phthalate, dibutyl phthalate, dibutyl tartrate, triacetin, mono methyl xylene sulfonamid. These plasticizers may be used in amounts of from 2 to 50% of the weight of the derivative of cellulose base.

The base sheet may be transparent, translucent or opaque and may be colorless or may have any suitable pigment, dye or effect material incorporated therein to produce mottled, variegated or other differential effects or pearl-like or nacreous appearance.

The base sheet may be in itself a laminated sheet of two or more layers. Thus the base sheet may have various artistic effects such as pearl, cloisonne, snakeskin and the like which cannot be obtained in any other manner. Between the layers in the base sheet, if a laminated sheet be used, there may be powders to lend color effects. Such powders may be powdered bronze, powdered aluminum and similar materials.

The covering or surface sheet of the material formed according to this invention is preferably a transparent sheet which however may be of any suitable color and have a suitable designed, painted or lithographed surface to yield novel effects. The color may be imparted to the sheet by means of dyes which do not materially reduce the transparency of the sheet or stars, lettering, gem designs etc. can be inserted, laminated or caused to adhere to the surface.

The sheets, both the base sheet and the surface sheet may be formed in any suitable manner. Thus the sheets may be formed by forming a slab or cylinder of a composition containing cellulose acetate, a plasticizer and a pigment and cutting these to sheets, by a planer or lathe device, to the proper thickness. The sheets may also be formed by extrusion through suitable orifices or cast on a film casting wheel.

The article may then be formed by laminating a base sheet and a surface sheet together with an added metallic foil material between the two. The lamination and bonding of the base sheet and surface sheet is so formed that the metallic foil although in very thin and narrow strips is not crushed into a single plane but tends to bury itself in the sheets. Thus some faces are parallel to the object others are at right angles while others are at obtuse or acute angles to the plane of the material. In this manner light is reflected from different faces of the foil depending upon the angle of the article to the source of light.

The added material may be metal foil of very thin narrow, strips, in the nature of tinsel, woven or knitted into a fabric either alone or alternating with threads of wool, cotton or other fiber. The wool, cotton or other fiber may be of any suitable color.

A suitable cement such as butyl acetate with or without low boiling solvents and high boiling solvents, is applied to the base sheet. The tinsel is then sprinkled on or a web containing tinsel is stretched over the base sheet. The surface sheet, preferably moistened with solvents, is then superimposed and the stack is subjected to heat and pressure in the usual manner. The action of the solvent, heat and pressure causes the two sheets to unite and also to allow the metallic foil to cut or push its way into the sheets without being pressed flat. The laminated sheets thus formed are seasoned and cut or shaped to articles in any suitable manner.

The sheets may be cut to strips and formed into tubes and fountain pen barrels by rolling same laterally or spirally around a mandrel or by drawing same through a shaping tube or by any other method of forming tubes from similar plastic sheets. The sheets may also be cemented to a base such as metal, wood etc. as a decorative panel for table tops and other uses. The term "web", as used in the specification and hereinafter in the claims, denotes only fabric-like structures having interstices therein and formed, for example, by weaving or knitting filamentary, strip, or like materials, and does not include continuous sheet materials.

It is to be understood that the foregoing detailed description is given merely by way of illustration and many variations may be made therein, without departing from the spirit of my invention.

Having described my invention, what I desire to secure by Letters Patent is:

1. Method of forming a decorative laminated article containing a base sheet and a transparent surface sheet of plastic material, which comprises applying a cement to the base sheet, placing thereon a material comprising thin metallic threads, superposing the surface sheet, at least the contacting face of which is in a softened condition, on the thin metallic threads and subjecting the assembly of base sheet, thin metallic threads and surface sheet to heat and pressure, whereby the thin metallic threads are pressed in such a manner as to exhibit a scintillating effect.

2. Method of forming a decorative laminated article containing a base sheet and a transparent surface sheet of plastic material, which comprises applying a cement to the base sheet, placing thereon a material comprising threads of thin metallic foil, superposing the surface sheet, at least the contacting face of which is in a softened condition, on the threads of thin metallic foil and subjecting the assembly of base sheet, threads of thin metallic foil and surface sheet to heat and pressure, whereby the threads of thin metallic foil are pressed in such a manner as to exhibit a scintillating effect.

3. Method of forming a decorative laminated article containing a base sheet and a transparent surface sheet of an organic derivative of cellulose, which comprises applying a cement to the base sheet, sprinkling thereon a material comprising threads of thin metallic foil, superposing the surface sheet, at least the contacting face of which is softened by a solvent for the organic derivative of cellulose, on the threads of thin metallic foil and subjecting the assembly of base sheet, threads of thin metallic foil and surface sheet to heat and pressure, whereby the threads of thin metallic foil are pressed in such a manner as to exhibit a scintillating effect.

4. Decorated material comprising a base, a layer of web containing a metallic foil, a transparent plastic sheet covering said material and firmly united to said base through the interstices of the web.

5. Decorated material comprising a base containing derivatives of cellulose, a layer of web material containing a metallic foil, a transparent sheet containing derivatives of cellulose covering said material and firmly united to said base through the interstices of the web.

6. Decorated material comprising a base containing cellulose acetate, a layer of web material containing a metallic foil, a transparent sheet containing cellulose acetate covering said material and firmly united to said base through the interstices of the web.

7. Decorated material comprising a base containing derivatives of cellulose, a layer of web material containing metallic foils, a transparent sheet containing derivatives of cellulose covering said material and firmly united to said base through the interstices of the web, said metallic foils being partially embedded in the base and sheet.

8. Decorated material comprising a base containing cellulose acetate, a layer of web material containing metallic foils, a transparent sheet containing cellulose acetate covering said material and firmly united to said base through the interstices of the web and said metallic foils being partially embedded in the base and sheet.

9. Decorated material comprising a base containing derivatives of cellulose, a layer of web material containing strips of metallic foils, a transparent sheet containing derivatives of cellulose covering said material and firmly united to said base through the interstices of the web and at least a part of the foils being at an angle to the surface of the covering sheet.

10. Decorated material comprising a base containing cellulose acetate, a layer of web material containing strips of metallic foils, a transparent sheet containing cellulose acetate covering said material and firmly united to said base through the interstices of the web, at least a part of the foils being at an angle to the surface of the covering sheet.

11. Decorative material comprising a base containing a derivative of cellulose, a transparent surface sheet containing a derivative of cellulose and an intermediate layer of a material comprising thin metallic threads, the base and the surface sheet being united to each other through the interstices of the intermediate layer, and the thin metallic threads being so arranged as to exhibit a scintillating effect.

12. Decorative material comprising an opaque base containing a derivative of cellulose, a transparent surface sheet containing a derivative of cellulose and an intermediate layer of a material comprising thin metallic threads, the base and the surface sheet being united to each other through the interstices of the intermediate layer, and the thin metallic threads being so arranged as to exhibit a scintillating effect.

13. Decorative material comprising a base containing a derivative of cellulose, a transparent surface sheet containing a derivative of cellulose and an intermediate layer of a material comprising thin threads of metallic foil, the base and the surface sheet being united to each other through the interstices of the intermediate layer, and the thin threads of metallic foil being so arranged as to exhibit a scintillating effect.

14. Decorative material comprising an opaque base containing a derivative of cellulose, a transparent surface sheet containing a derivative of cellulose and an intermediate layer of a material comprising thin threads of metallic foil, the base and the surface sheet being united to each other through the interstices of the intermediate layer, and the thin threads of metallic foil being so arranged as to exhibit a scintillating effect.

15. Tubular articles comprising an inner layer of plastic material containing a derivative of cellulose, an intermediate layer of material comprising thin metallic threads and a transparent outer layer of plastic material containing a derivative of cellulose, the layers of derivative of cellulose material being united to each other through the interstices of the intermediate layer, and the thin metallic threads being so arranged as to exhibit a scintillating effect.

16. Tubular articles comprising an inner layer of plastic material containing a derivative of cellulose, an intermediate layer of material comprising thin threads of metallic foil and a transparent outer layer of plastic material containing a derivative of cellulose, the layers of derivative of cellulose material being united to each other through the interstices of the intermediate layer, and the thin threads of metallic foil being so arranged as to exhibit a scintillating effect.

17. Tubular articles comprising an inner layer of plastic material containing a derivative of cellulose, an intermediate layer of material comprising a web of thin metallic threads and a transparent outer layer of plastic material containing a derivative of cellulose, the layers of derivative of cellulose material being united to each other through the interstices of the intermediate layer, and the thin metallic threads being so arranged as to exhibit a scintillating effect.

18. Tubular articles comprising an inner layer of plastic material containing a derivative of cellulose, an intermediate layer of material comprising a web of thin threads of metallic foil and a transparent outer layer of plastic material containing a derivative of cellulose, the layers of derivative of cellulose material being united to each other through the interstices of the intermediate layer, and the thin threads of metallic foil being so arranged as to exhibit a scintillating effect.

FRED J. HOARLE.

CERTIFICATE OF CORRECTION.

Patent No. 2,081,538.   May 25, 1937.

FRED J. HOARLE.

It is hereby certified that error appears in the printed specification of the above numbered patent requiring correction as follows: Page 2, second column, lines 67 and 75, claims 8 and 9 respectively, strike out the word " and" and insert instead a comma; and that the said Letters Patent should be read with this correction therein that the same may conform to the record of the case in the Patent Office.

Signed and sealed this 31st day of August, A. D. 1937.

Leslie Frazer (Seal)   Acting Commissioner of Patents.